US011915649B2

(12) United States Patent
Liu et al.

(10) Patent No.: US 11,915,649 B2
(45) Date of Patent: Feb. 27, 2024

(54) PIXEL CIRCUIT AND DISPLAY PANEL

(71) Applicant: WUHAN CHINA STAR OPTOELECTRONICS SEMICONDUCTOR DISPLAY TECHNOLOGY CO., LTD., Wuhan (CN)

(72) Inventors: Dachao Liu, Wuhan (CN); Mian Zeng, Wuhan (CN); Liang Sun, Wuhan (CN)

(73) Assignee: WUHAN CHINA STAR OPTOELECTRONICS SEMICONDUCTOR DISPLAY TECHNOLOGY CO., LTD., Wuhan (CN)

( * ) Notice: Subject to any disclaimer, the term of this patent is extended or adjusted under 35 U.S.C. 154(b) by 0 days.

(21) Appl. No.: 17/795,525

(22) PCT Filed: Jun. 30, 2022

(86) PCT No.: PCT/CN2022/102991

§ 371 (c)(1),
(2) Date: Jul. 26, 2022

(65) Prior Publication Data

US 2023/0402005 A1 Dec. 14, 2023

(30) Foreign Application Priority Data

Jun. 8, 2022 (CN) ......................... 202210643136.9

(51) Int. Cl.

| | |
|---|---|
| ***G09G 3/3283*** | (2016.01) |
| ***G09G 3/32*** | (2016.01) |
| ***G09G 3/3233*** | (2016.01) |
| ***G09G 3/3266*** | (2016.01) |
| ***G09G 3/3275*** | (2016.01) |

(52) U.S. Cl.
CPC ......... *G09G 3/3233* (2013.01); *G09G 3/3266* (2013.01); *G09G 3/3275* (2013.01);
(Continued)

(58) Field of Classification Search
CPC ..................................................... G09G 3/3233
See application file for complete search history.

(56) References Cited

U.S. PATENT DOCUMENTS

2005/0052366 A1* 3/2005 Kim ..................... G09G 3/3233 345/76
2006/0043375 A1* 3/2006 Takasugi ............... H01L 29/458 257/E29.147

(Continued)

FOREIGN PATENT DOCUMENTS

CN 103971630 A 8/2014
CN 108847186 A 11/2018

(Continued)

OTHER PUBLICATIONS

PCT International Search Report for International Application No. PCT/CN2022/102991, dated Nov. 28, 2022, 13pp.

(Continued)

*Primary Examiner* — Nan-Ying Yang
(74) *Attorney, Agent, or Firm* — The Roy Gross Law Firm, LLC; Roy Gross

(57) ABSTRACT

Embodiments of the present disclosure are directed to a pixel circuit and a display panel. The pixel circuit includes a light-emitting device, a driving transistor, a data signal writing module, a threshold voltage compensation module, a first initialization module, a light-emitting control module, and a coupling capacitor. By adding a coupling capacitor in the pixel circuit, the gate potential of the driving transistor is maintained at the initial value under a long period of display.

19 Claims, 6 Drawing Sheets

(52) U.S. Cl.
CPC ............... *G09G 2320/0233* (2013.01); *G09G 2320/0247* (2013.01)

(56) References Cited

U.S. PATENT DOCUMENTS

| | | | | |
|---|---|---|---|---|
| 2009/0243977 | A1* | 10/2009 | Chung ................. | G09G 3/3233 345/76 |
| 2012/0019504 | A1 | 1/2012 | Han et al. | |
| 2014/0168195 | A1* | 6/2014 | Kumeta ............... | G09G 3/3233 345/212 |
| 2016/0372037 | A1 | 12/2016 | Lim et al. | |
| 2020/0372862 | A1* | 11/2020 | Yamashita ........... | G09G 3/3233 |

FOREIGN PATENT DOCUMENTS

| | | | |
|---|---|---|---|
| CN | 110085170 | A | 8/2019 |
| CN | 110767163 | A | 2/2020 |
| CN | 111179859 | A | 5/2020 |
| CN | 111445848 | A | 7/2020 |
| CN | 112289267 | A | 1/2021 |
| CN | 112382235 | A | 2/2021 |
| CN | 114005400 | A | 2/2022 |
| CN | 114078430 | A | 2/2022 |
| CN | 114120909 | A | 3/2022 |
| CN | 114170959 | A | 3/2022 |
| CN | 114220839 | A | 3/2022 |
| CN | 114333700 | A | 4/2022 |
| CN | 114582283 | A | 6/2022 |
| WO | 2021258915 | A1 | 12/2021 |

OTHER PUBLICATIONS

PCT Written Opinion of the International Search Authority for International Application No. PCT/CN2022/102991, dated Nov. 28, 2022, 10pp.

* cited by examiner

PIXEL CIRCUIT AND DISPLAY PANEL

This application is a National Phase of PCT Patent Application No. PCT/CN2022/102991 having International filing date of Jun. 30, 2022, which claims the benefit of priority of Chinese Patent Application No. 202210643136.9, filed Jun. 8, 2022, the contents of which are all incorporated herein by reference in their entirety.

FIELD OF INVENTION

The present disclosure relates to the field of display technology, more particularly to a pixel circuit and a display panel.

BACKGROUND

Light-emitting devices such as mini light-emitting diodes, micro-light-emitting diodes, and organic light-emitting diodes have the advantages of high brightness, high contrast, and high color gamut, and have been widely used in the field of high-performance displays. The leakage phenomenon of the existing pixel circuit is serious. When the light-emitting device emits light, the potential of the gate of the driving transistor changes due to leakage current. In the case of low-frequency driving, the brightness of one frame changes greatly, and flicker occurs, which affects the display quality of the display device.

SUMMARY

Technical Problem

The present disclosure provides a pixel circuit and a display panel to solve the problem of changing the potential of the gate of the driving transistor due to leakage in the existing pixel circuit.

Technical Solution

This present disclosure provides a pixel circuit. The pixel circuit includes a light emitting device, a data signal writing module, a driving transistor, a threshold voltage compensation module, a first initialization module, a light emitting control module, and a coupling capacitor.

The light emitting device is applied with a first power signal and a second power signal.

The data signal writing module outputs a data signal in response to a first scan signal.

The driving transistor has a source coupled to the data signal writing module.

The threshold voltage compensation module is fed with coupled to the second scan signal and the first power signal, and is connected to a drain of the driving transistor and a gate of the driving transistor.

The first initialization module is fed with a control signal and a first initial signal, and is connected to the gate of the driving transistor.

The light emitting control module is fed with a light control signal, the first power signal and the second power signal.

The coupling capacitor is fed with an adjusting signal and connected to the first initialization module or the threshold voltage compensation module.

Optionally, the threshold voltage compensation module comprises a second transistor, a seventh transistor, and a first capacitor.

The second transistor has a gate fed with the second scan signal, a source coupled to the gate of the driving transistor, and a drain coupled to a first node. The seventh transistor has a gate fed with the first scan signal, a source coupled to a first node, and a drain coupled to the drain of the driving transistor. The first capacitor is fed with the first power signal and coupled to the gate of the driving transistor.

Optionally, one end of the coupling capacitor is connected to the first node, and the other end of the coupling capacitor is fed with the adjusting signal.

Optionally, the second transistor is a double-gate transistor; a first gate and a second gate of the second transistor are connected to the second scan signal. One end of the coupling capacitor is connected to a double gate node of the second transistor, and the other end of the coupling capacitor is fed with the adjusting signal.

Optionally, the first initialization module comprises a third transistor that comprises a gate fed with the control signal, a source fed with the first initial signal, and a drain connected to the first node.

Optionally, the threshold voltage compensation module comprises a second transistor, a second transistor, and a first capacitor.

The second transistor has a gate fed with the second scan signal, a source coupled to the gate of the driving transistor, and a drain coupled to the drain of the driving transistor. The first capacitor is fed with the first power signal and coupled to the gate of the driving transistor.

Optionally, the second transistor is a double-gate transistor; a first gate and a second gate of the second transistor are connected to the second scan signal. One end of the coupling capacitor is connected to a double gate node of the second transistor, and the other end of the coupling capacitor is fed with the adjusting signal.

Optionally, the first initialization module comprises a third transistor that comprises a gate fed with the control signal, a source fed with the first initial signal, and a drain connected to the gate of the driving transistor.

The third transistor is a double-gate transistor, and the pixel circuit further comprises a second capacitor, where one end of the second capacitor is connected to the double gate node of the third transistor, and the other end of the second capacitor is fed with the first initial signal.

Optionally, the first initialization module comprises a third transistor that comprises a gate fed with the control signal, a source fed with the first initial signal, and a drain connected to the gate of the driving transistor.

The third transistor is a double-gate transistor. One end of the coupling capacitor is connected to the double-gate node of the third transistor, and the other end of the coupling capacitor is fed with the adjusting signal.

Optionally, the second transistor is a double-gate transistor. The first gate and second gate of the second transistor are connected to the second scan signal.

The pixel circuit further comprises a second capacitor that is connected to the double gate node of the second transistor, and is fed with the first initial signal.

Optionally, the pixel circuit further comprises a second initialization module.

The second initialization module includes a sixth transistor that has a gate fed with the first scan signal, a source connected to the drain of the driving transistor, and a drain fed with the second initial signal.

Optionally, the pixel circuit further comprises a second initialization module.

The second initialization module includes a sixth transistor that has a gate fed with the fifth scan signal, a source connected to the drain of the driving transistor, and a drain fed with the first initial signal.

Optionally, the light emitting control module comprises a first light emitting control unit and a second light emitting control unit. The first light emitting control unit, comprises a fourth transistor. The second light emitting control unit includes a fifth transistor.

The gate of the fourth transistor and the gate of the fifth transistor are fed with the light emitting control signal. A source of the fourth transistor is fed with the first power signal, and a drain of the fourth transistor is connected to the source of the driving transistor. A source of the fifth transistor is connected to the first electrode of the light emitting device, and a drain of the fifth transistor is connected to the drain of the driving transistor.

Optionally, the coupling capacitor is a variable capacitor.

According to another embodiment of the present disclosure, a display panel includes a plurality of pixel units arranged in an array. Each of pixel units comprises a pixel circuit as provided above.

Advantageous Effects

Embodiments of the present disclosure are directed to a pixel circuit and a display panel. The pixel circuit includes a light-emitting device, a driving transistor, a data signal writing module, a threshold voltage compensation module, a first initialization module, a light-emitting control module, and a coupling capacitor. By adding a coupling capacitor in the pixel circuit, the gate potential of the driving transistor is maintained at the initial value under a long period of display. Therefore, when the display quality operates at low frequency, the potential stability of the gate driving the transistor is improved, the flicker is reduced, and the display quality is improved.

BRIEF DESCRIPTION OF DRAWINGS

In order to clearly illustrate the technical solution in the embodiment of the present disclosure, the following will be a brief introduction to the drawings to be used in the description of the embodiment, it is obvious that the drawings described below are only some embodiments of the present disclosure, for those skilled in the art, without paying creative labor, other drawings can also be obtained according to these drawings.

DETAILED DESCRIPTION OF EMBODIMENTS

The following will be combined with the drawings in the embodiment of the present disclosure, the technical solution in the embodiment of the present disclosure is clearly and completely described, it is clear that the embodiment described is only a part of the embodiment of the present disclosure, not all embodiments. Based on the embodiments in the present disclosure, all other embodiments obtained by those skilled in the art without the premise of creative labor, are within the scope of protection of the present disclosure.

In the description of the present disclosure, it is to be understood that the terms “first” and “second” are for descriptive purposes only and cannot be construed as indicating or implying relative importance or implicitly indicating the number of technical features indicated. Thus, the limitation of “first” and “second” and the like features may expressly or implicitly include one or more of the said features, and therefore can not be construed as a limitation of the present disclosure. In addition, it should be noted that, unless otherwise expressly specified and qualified, the terms “connected”, “coupled” should be understood in a broad sense. For example, it can be a mechanical connection or an electrical connection. It can be directly connected, indirectly through an intermediate medium, or it can be a communication within two components. For those of ordinary skill in the art, the specific meaning of the above terms in the present invention may be understood in a particular case.

The present disclosure provides a pixel circuit and display panel as detailed below. It should be noted that the order of description of the following embodiments is not used as a limitation of the preferred order of embodiments of the present disclosure.

It should be noted that the source and drain of the transistor provided in the present disclosure are symmetrical and interchangeable.

Figure 1:
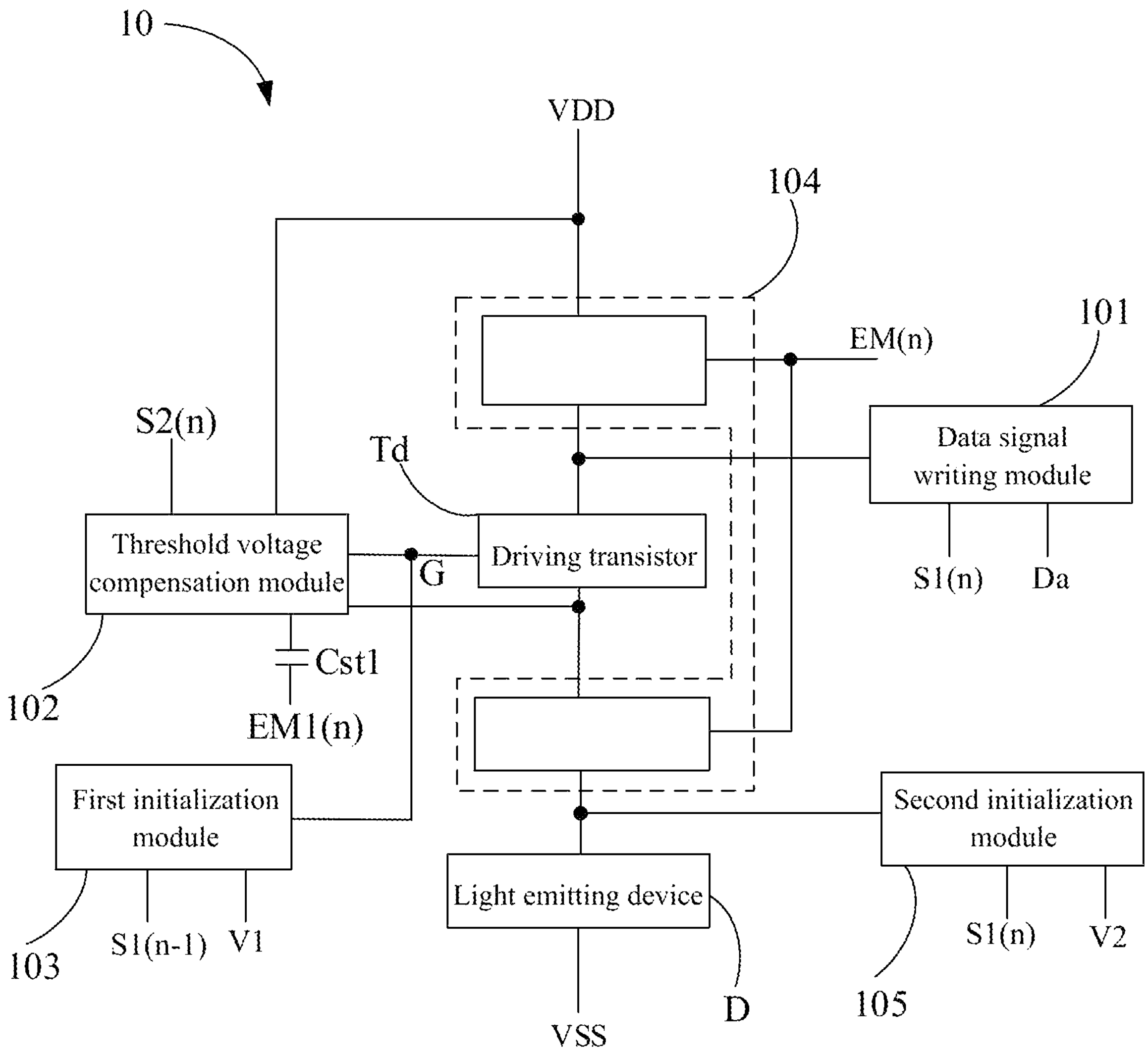
FIG. 1 is a block diagram of the pixel circuit of the present disclosure.

Referring to FIG. 1, FIG. 1 is a block diagram of the pixel circuit of the present disclosure. The pixel circuit 10 includes a light emitting device D, a driving transistor Td, a data signal writing module 101, a threshold voltage compensation module 102, a first initialization module 103, a light emitting control module 104, and a coupling capacitor Cst1.

One end of the light emitting device D is fed with a first power signal VDD. The other end of the light emitting device D is fed with a second power signal VSS.

The data signal writing module 101 outputs a data signal Da in response to a first scan signal S1(n).

The source of the transistor Td is fed with the data signal writing module 101.

The threshold voltage compensation module 102 is fed with the second scan signal S2(n) and the first power signal VDD. The threshold voltage compensation module 102 is connected to the drain of the driving transistor Td and the gate of the driving transistor Td.

The first initialization module 103 is fed with a control signal and the first initialization signal V1. The first initialization module 103 is connected to the gate G of the driving transistor Td. The control signal may be the third scan signal S1(n−1). The first initialization module 103 is directly connected to the gate G of the driving transistor Td, or indirectly connected to the gate G of the driving transistor Td through the threshold voltage compensation module 102, which will be described in the following embodiments.

The light-emitting control module 104 is fed with the light-emitting control signal EM, the first power signal VDD and the second power signal VSS.

One end of the coupling capacitor Cst1 is fed with the adjustment signal EM1(n). The other end of the coupling capacitor Cst1 is connected to the first initialization module 103 or the threshold voltage compensation module 102.

The initial potential of the gate G of the driving transistor Td refers to the potential of the gate G of the driving transistor Td when there is no leakage and the light-emitting device D emits the target brightness in the light-emitting phase.

It should be noted that, in FIG. 1, the first initialization module 103 and the other end of the coupling capacitor Cst are both connected to the threshold voltage compensation module 102 as an example for illustration. It should not be construed as a limitation of the present disclosure.

The coupling capacitor Cst1 of the pixel circuit 10 couples the gate potential of the driving transistor to ensure that the gate potential of the driving transistor remains at the initial value.

During the light-emitting phase, the voltage value of the adjustment signal EM1(n) alternates between the first potential and the second potential. The first potential is greater than the initial potential of the gate G of the driving transistor Td, and the second potential is less than the initial potential of the gate G of the driving transistor Td.

In the light-emitting phase, by adjusting the time period occupied by the first potential and the second potential of the adjustment signal EM1(n) to couple the potential on a node that is connected to the gate G of the driving transistor Td, leakage current from the gate G of the driving transistor Td is reduced, and the potential stability of the gate G of the driving transistor Td is improved. Therefore, the flicker during low-frequency driving is reduced, and the display quality under low-frequency driving is improved.

The pixel circuit 10 includes a second initialization module 105 that is fed with the first scan signal S1(n) and the second initial signal V2, and is connected to the first electrode of the light emitting device D. The second initialization module 105 is used to initialize the potential of the first electrode of the light emitting device D in response to the first scan signal S1(n).

When the light emitting device D is a light emitting diode, the first electrode of the light emitting device D may be an anode of the light emitting device D.

The first initial signal V1 and the second initial signal V2 may be the same signal, or may be different signals. The first initial signal V1 and the second initial signal V2 can be set according to the reset requirement of the pixel circuit 10.

The second initialization module 105 of the pixel circuit 10 can initialize the potential of the first electrode of the light-emitting device D, so as to prevent the residual charge of the first electrode of the light-emitting device D from affecting the light-emitting brightness of the light-emitting device D.

Figure 2:
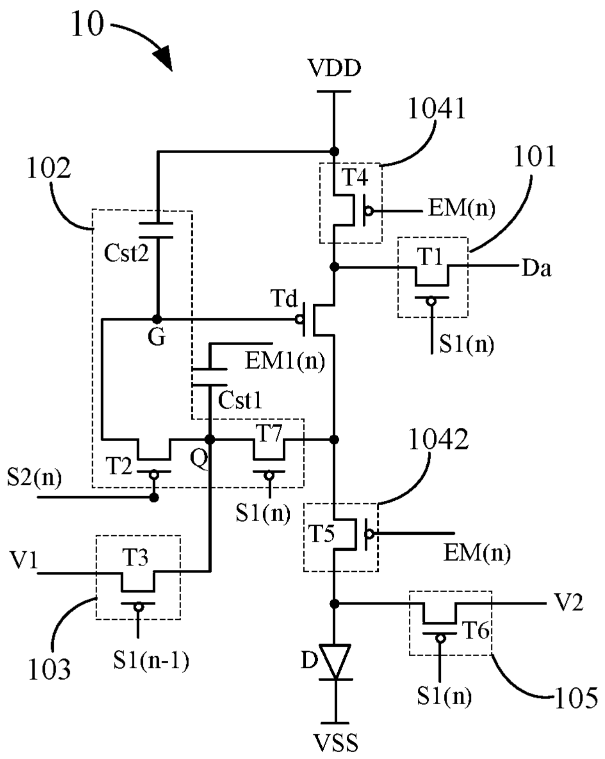
FIG. 2 illustrates a circuit diagram of the pixel circuit according to a first embodiment of the present disclosure.

Please refer to FIG. 2 illustrating a circuit diagram of a pixel circuit according to a first embodiment. The data signal writing module 101 includes a first transistor T1.

The gate of the first transistor T1 is fed with the first scan signal S1(n). The source of the first transistor T1 is fed with the data signal Da. The drain of the first transistor T1 is electrically connected to the source of the driving transistor Td. The data signal writing module 101 can also be formed by using a plurality of transistors in series.

The threshold voltage compensation module 102 includes a second transistor T2, a seventh transistor T7 and a first capacitor Cst2.

The gate of the second transistor T2 is connected to the second scan signal S2(n). The source of the second transistor T2 and one end of the first capacitor Cst2 are both connected to the gate of the driving transistor Td. The drain of the second transistor T2 and the source of the seventh transistor T7 are connected to the first node Q. The drain of the seventh transistor T7 is connected to the drain of the driving transistor Td. The gate of the seventh transistor T7 is connected to the first scan signal S1(n). The other end of the first capacitor Cst2 is connected to the first power signal VDD.

In this embodiment, one end of the coupling capacitor Cst is connected to the first node Q. The other end of the coupling capacitor Cst is connected to the adjustment signal EM1(n).

When the adjustment signal EM1(n) changes alternately between the first potential and the second potential, the coupling capacitor Cst will couple the potential of the first node Q. Since the first potential is greater than the initial potential of the gate G of the driving transistor Td, and the second potential is less than the gate G of the driving transistor Td, the potential of the first node Q will be alternately coupled to a value that is greater than the initial potential of the gate G of the driving transistor Td or less than the initial potential of the gate G of the driving transistor Td. Therefore, during a long light-emitting time, the alternate high and low potentials of the first node Q causes the initial potential of the gate G of the driving transistor Td kept at the initial value.

The first initialization module 103 includes a third transistor T3. The control signal connected to the gate of the third transistor T3 is the third scan signal S1(n−1). The source of the third transistor T3 is connected to the first initial signal V1. The drain of the third transistor T3 is connected to the first node Q.

The first initialization module 103 is connected to the first node Q. The threshold voltage compensation module 102 is electrically connected to the gate G of the driving transistor Td. While initializing the gate potential of the driving transistor Td, the number of transistors connected to the gate G of the driving transistor Td can be reduced. The leakage path of the gate G of the driving transistor Td is reduced. Therefore, the potential stability of the gate G of the driving transistor Td can be improved, thereby reducing flicker during low-frequency display and improving display quality.

The lighting control module 104 includes a first lighting control unit 1041 and a second lighting control unit 1042. The first light emission control unit 1041 includes a fourth transistor T4. The second light emission control unit 1042 includes a fifth transistor T5. The gate of the fourth transistor T4 and the gate of the fifth transistor T5 are both connected to the light emission control signal EM(n). The source of the fourth transistor T4 is connected to the first power signal VDD. The drain of the fourth transistor T4 is electrically connected to the source of the driving transistor Td. The source of the fifth transistor T5 is electrically connected to the first electrode of the light emitting device D. The drain of the fifth transistor T5 is electrically connected to the drain of the driving transistor Td.

The lighting control module 104 may include three or more lighting control units. Each light-emitting control unit is connected to the first power signal VDD and the second power signal VSS. The three or more light-emitting control units may be connected to the same light-emitting control signal EM, or different light-emitting control signals EM. In addition, each light-emitting control unit includes a plurality of transistors connected in series.

The second initialization module 105 includes a sixth transistor T6. The gate of the sixth transistor T6 is connected to the first scan signal S1(n). The source of the sixth transistor T6 is electrically connected to the drain of the driving transistor Td. The drain of the sixth transistor T6 is connected to the second initial signal V2. The second initialization module 105 may include a plurality of transistors connected in series.

Both the first power signal VDD and the second power signal VSS output a predetermined voltage value. In addition, the potential of the first power signal VDD is greater than the potential of the second power signal VSS. Specifically, the potential of the second power signal VSS may be the potential of ground.

Each transistor in the pixel circuit 10 may be a low temperature polysilicon thin-film transistor, an oxide semiconductor thin-film transistor, or an amorphous silicon thin film transistors. In addition, the transistors of the pixel circuit 10 may also be P-type transistors or N-type transistors. Further, the transistors of the pixel circuit 10 are transistors of the same type, so as to avoid the influence on the pixel circuit 10 caused by the differences between different types of transistors.

In addition, since the pixel circuit 10 effectively reduces the leakage current by setting the coupling capacitor Cst1 and reducing the leakage path of the gate of the driving transistor Td. Therefore, compared with using Indium Gallium Zinc Oxide (IGZO) transistors with low leakage current in the existing Low Temperature Polycrystalline Oxide (LTPO) technology to solve the problem of serious flickering under low frequency driving, in this embodiment, only Low Temperature Poly-Silicon (LTPS) transistors can be used. The structure and process of the pixel circuit 10 are simpler, and the cost is effectively reduced.

The following embodiments of the present disclosure are all described by taking each transistor in the pixel circuit 10 as a P-type transistor as an example, which should not be construed as a limitation of the present disclosure.

Figure 3:
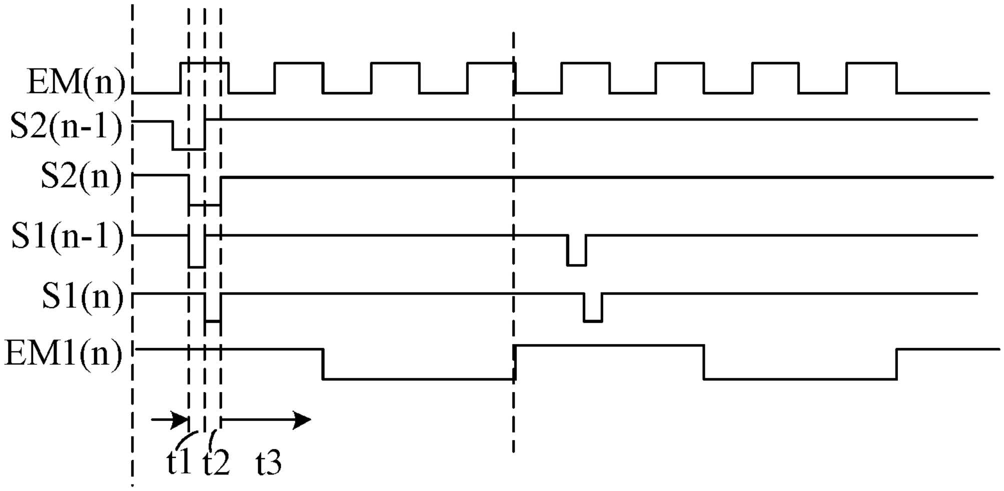
FIG. 3 illustrates a timing diagram of the pixel circuit shown in FIG. 2.

Please refer to FIG. 3 illustrating a timing diagram of the pixel circuit shown in FIG. 2. Waveforms of the light emission control signal EM(n), the adjustment signal EM1 (n), the first scan signal S1(n), the second scan signal S2(n) and the third scan signal S1(n−1) correspond to the reset phase t1, the threshold voltage compensation phase t2, and the light-emitting phase t3 are illustrated. That is, within one frame time, the driving control timing of the pixel circuit 10 includes a reset phase t1, a threshold voltage compensation phase t2, and a light-emitting phase t3.

In the reset phase t1, the second scan signal S2(n) and the third scan signal S1(n−1) are both at low voltage level. The first scan signal S1(n) and the light emission control signal EM(n) are both high potentials. At this time, the first transistor T1, the fourth transistor T4, the fifth transistor T5, the sixth transistor T6 and the seventh transistor T7 are all turned off. The second transistor T2 and the third transistor T3 are turned on. The first initial signal V1 is output to the gate of the driving transistor Td through the first transistor T1 and the second transistor T2. The potential of the gate of the driving transistor Td is reset to the voltage level of the first initial signal V1.

In the threshold voltage compensation phase t2, the first scan signal S1(n) and the second scan signal S2(n) are both at low voltage level. The third scan signal S1(n−1) and the light emission control signal EM(n) are both high potentials. At this time, the third transistor T3, the fourth transistor T4, and the fifth transistor T5 are all turned off. The first transistor T1, the second transistor T2, and the seventh transistor T7 are turned on. The data signal Da is written to the gate of the driving transistor Td through the first transistor T1, the driving transistor Td, the seventh transistor T7 and the second transistor T2. When the potential of the gate G of the driving transistor Td is charged to Vdata—Vth, the driving transistor Td is turned off, and voltage on the gate of the driving transistor Td no longer rises. The first capacitor C1 stores the potential of the gate G of the driving transistor Td.

Meanwhile, since the first scan signal S1(n) is at a low potential, the sixth transistor T6 is turned on. The potential of the first electrode of the light-emitting device D is reset to the potential of the second initial signal V2, thereby ensuring that the light-emitting device D does not emit light in the threshold voltage compensation phase t2.

In the light-emitting phase t3, the light-emitting control signal EM(n) is at a low voltage level, and the first scan signal S1(n), the second scan signal S2(n) and the third scan signal S1(n−1) are all at a high voltage level. At this time, the first transistor T1, the second transistor T2, the third transistor T3, the sixth transistor T6 and the seventh transistor T7 are all turned off. The driving transistor Td, the fourth transistor T4 and the fifth transistor T5 are all turned on. The driving transistor Td generates a driving current corresponding to the data signal Da based on the potential of the gate G. The driving current flows to the light emitting device D through the turned-on fourth transistor T4, the driving transistor Td and the fifth transistor T5, and drives the light emitting device D to emit light.

In the light-emitting phase t3, the voltage value of the adjustment signal EM1(n) alternates between the first potential and the second potential. The time period during which the adjustment signal EM1(n) is at the first potential may be greater than, equal to or less than the time period during which the adjustment signal EM1(n) is at the second potential. The first potential is greater than the initial potential of the gate G of the driving transistor Td, and the second potential is less than the gate G of the driving transistor Td the initial potential. When the adjustment signal EM1(n) jumps from the first potential to the second potential, the potential of the first node Q is less than the initial potential of the gate G of the driving transistor Td. The potential of the gate G of the driving transistor Td decreases due to current leakage. When the adjustment signal EM1(n) jumps from the second potential to the first potential, the potential of the first node Q is greater than the initial potential of the gate G of the driving transistor Td. The gate potential of the driving transistor Td increases. Therefore, it can be guaranteed that the potential of the gate of the driving transistor Td maintains at an initial value.

In the light emission phase t3, the seventh transistor T7 can reduce an impact of the potential of the gate of the driving transistor Td caused by the drain of the driving transistor Td.

Figure 4:
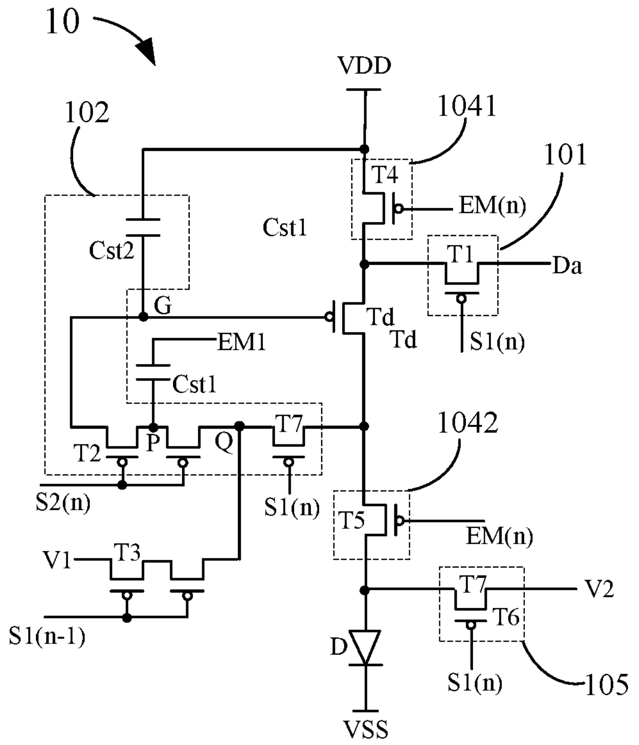
FIG. 4 illustrates a circuit diagram of the pixel circuit according to a second embodiment of the present disclosure.

Please refer to FIG. 4 illustrating a circuit diagram of the pixel circuit according to a second embodiment of the present disclosure. Different from the pixel circuit 10 shown in FIG. 2, the second transistor T2 is a dual-gate transistor. Both the first gate and the second gate of the second transistor T2 are connected to the second scan signal S2(n). One end of the coupling capacitor Cst is connected to the double gate node P of the second transistor T2. The other end of the coupling capacitor Cst is connected to the adjustment signal EM1(n).

The leakage current of a double-gate transistor is smaller than that of a single-gate transistor. Therefore, in this embodiment, the second transistor T2 as a dual-gate transistor can reduce the leakage current at the gate G of the driving transistor Td, ensuring that the potential stability of the gate G of the driving transistor Td.

The driving timing of the pixel circuit 10 is the same as the driving timing of the pixel circuit 10 in FIG. 2. For details, please refer to the above content, which will not be repeated here.

Figure 5:
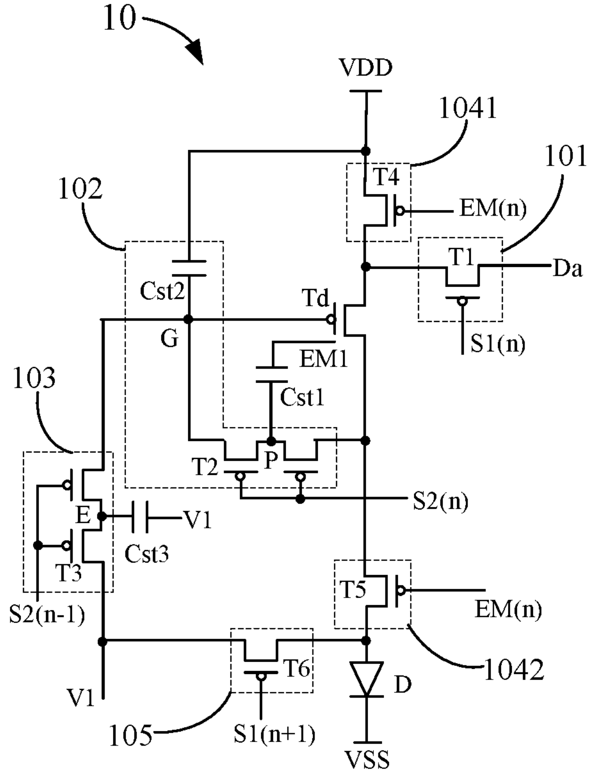
FIG. 5 illustrates a circuit diagram of the pixel circuit according to a third embodiment of the present disclosure.

Please refer to FIG. 5 illustrating a circuit diagram of the pixel circuit according to a third embodiment of the present disclosure. Different from the pixel circuit 10 shown in FIG. 2, the threshold voltage compensation module 102 includes a second transistor T2 and a first capacitor Cst2.

The gate of the second transistor T2 is fed with the second scan signal S2(n). The source of the second transistor T2 and one end of the first capacitor Cst2 are both connected to the gate G of the driving transistor Td. The drain of the second transistor T2 is connected to the drain of the driving transistor Td. The other end of the first capacitor Cst2 is connected to the first power signal VDD.

The second transistor T2 is a dual-gate transistor. Both the first gate and the second gate of the second transistor T2 are connected to the second scan signal S2(n). One end of the coupling capacitor Cst is connected to the double gate node P of the second transistor T2. The other end of the coupling capacitor Cst is connected to the adjustment signal EM1(n).

The pixel circuit 10 includes seven transistors and one capacitor (7T1C) to control the light-emitting device D. The pixel circuit 10 with fewer components is a simple and stable structure, and saves costs.

Further, the first initialization module 103 includes a third transistor T3. The control signal fed with the gate of the third transistor T3 is the fourth scan signal S2(n−1). The source of the third transistor T3 is fed with the first initial signal V1. The drain of the third transistor T3 is connected to the gate of the driving transistor Td.

The third transistor T3 is a double-gate transistor. The pixel circuit 10 further includes a second capacitor Cst3. One end of the second capacitor Cst3 is connected to the double gate node E of the third transistor T3. The other end of the second capacitor Cst3 is fed with the first initial signal V1.

The second capacitor Cst3 can clamp the potential of the double gate node E of the third transistor T3, thereby reducing the leakage of the gate G of the driving transistor Td. In addition, the other end of the second capacitor Cst3 is fed with the first initial signal V1, simplifying the signal complexity in the pixel circuit 10.

The second initialization module 105 is fed with the fifth scan signal S1(n)+1) and the second initial signal V2, and is connected to the first electrode of the light emitting device D. The second initialization module 105 includes a sixth transistor T6. The gate of the sixth transistor T6 is fed with the fifth scan signal S1(n)+1). The source of the sixth transistor T6 is connected to the source of the driving transistor Td. The drain of the sixth transistor T6 is fed with the second initial signal V2. The second initial signal V2 may be the same signal as the first initial signal V1.

Figure 6:
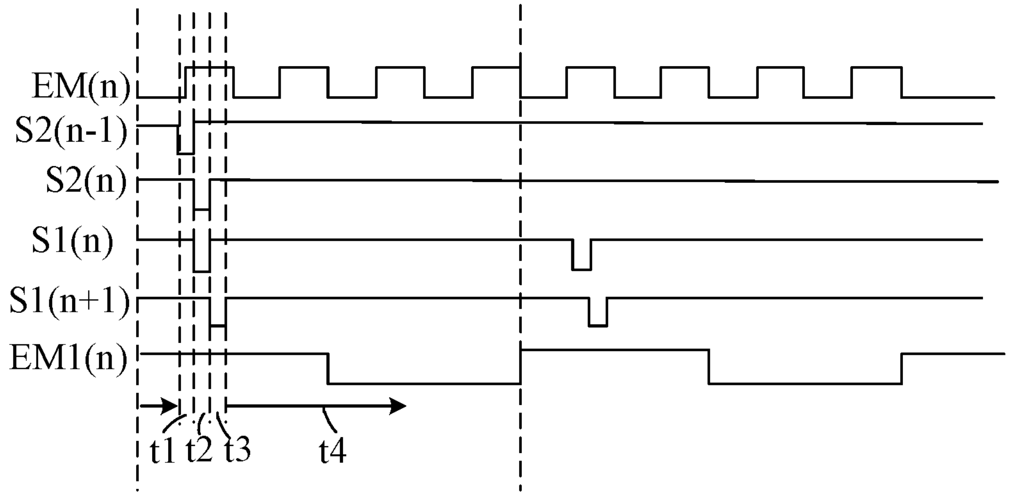
FIG. 6 shows a timing diagram of the pixel circuit shown in FIG. 5.

Please refer to FIG. 6 illustrating a timing diagram of the pixel circuit shown in FIG. 5. Waveforms of the light emission control signal EM(n), the adjustment signal EM1 (n), the first scan signal S1(n), the second scan signal S2(n), the fourth scan signal S2(n−1) and the fifth scan signal S1(n)+1) corresponds to the first reset phase t1, the threshold voltage compensation phase t2, the second reset phase t3 and the light-emitting phase t4 are illustrated in FIG. 6. That is, within one frame time, the driving control timing of the pixel circuit 10 includes a first reset phase t1, a threshold voltage compensation phase t2, a second reset phase t3, and a light-emitting phase t4.

In the first reset phase t1, the fourth scan signal S2(n−1) is at the low voltage level. The first scan signal S1(n), the second scan signal S2(n), the fifth scan signal S1(n)+1) and the light emission control signal EM(n) are all at the high voltage level. At this time, the first transistor T1, the second transistor T2, the fourth transistor T4, the fifth transistor T5 and the sixth transistor T6 are all turned off. The third transistor T3 is turned on. The first initial signal V1 is output to the gate G of the driving transistor Td through the third transistor T3. The potential of the gate G of the driving transistor Td is reset to the potential of the first initial signal V1.

In the threshold voltage compensation phase t2, the first scan signal S1(n) and the second scan signal S2(n) are both at low voltage level. The fourth scan signal S2(n−1), the fifth scan signal S1(n)+1) and the light emission control signal EM(n) are all at the high voltage level. At this time, the third transistor T3, the fourth transistor T4, and the fifth transistor T5 are all turned off. Both the first transistor T1 and the second transistor T2 are turned on. The data signal Da is fed to the gate G of the driving transistor Td through the first transistor T1, the driving transistor Td and the second transistor T2. When the potential of the gate G of the driving transistor Td is charged to Vdata—Vth, the driving transistor Td is turned off. The potential of the gate of the driving transistor Td no longer rises. The first capacitor C1 stores the potential of the gate G of the driving transistor Td.

In the second reset phase t3, the fifth scan signal S1(n)+1) is at the low voltage level, the light emission control signal EM(n), the first scan signal S1(n), the second scan signal S2(n) and the fourth scan signal S2(n−1) are all at the high voltage level. The sixth transistor T6 is turned on. The potential of the first electrode of the light emitting device D is reset to the potential of the second initial signal V2. Thus, it is ensured that the light-emitting device D does not emit light in the threshold voltage compensation phase t2.

In the light-emitting phase t4, the light-emitting control signal EM(n) is at a low voltage level. The first scan signal S1(n), the second scan signal S2(n), the fourth scan signal S2(n−1) and the fifth scan signal S1 (n+1) are all at high voltage level. At this time, the first transistor T1, the second transistor T2, the third transistor T3 and the sixth transistor T6 are all turned off. The driving transistor Td, the fourth transistor T4 and the fifth transistor T5 are all turned on. The driving transistor Td generates a driving current based on the data signal Da. The driving current flowing through the light emitting device D through the fourth transistor T4, the driving transistor Td and the fifth transistor T5, and drives the light emitting device D to emit light.

In the light-emitting phase t4, the voltage value of the adjustment signal EM1(n) alternates between the first potential and the second potential. The time during which the adjustment signal EM1(n) is at the first potential may be longer than, equal to or less than the time during which the adjustment signal EM1(n) is at the second potential. The first potential is greater than the initial potential of the gate G of the driving transistor Td, and the second potential is less than the initial potential of the gate G of the driving transistor Td. When the adjustment signal EM1(n) drops from the first potential to the second potential, the potential of the double gate node P of the second transistor T2 is smaller than the initial potential of the gate G of the driving transistor Td. The potential of the gate of the driving transistor Td decreases due to current leakage. When the adjustment signal EM1(n) jumps from the second potential to the first potential, the potential of the double gate node P of the second transistor T2 is greater than the initial potential of the gate G of the driving transistor Td. The gate potential of the driving transistor Td increases. Thus, the potential of the gate of the driving transistor Td can be kept at the initial value for a long-term display.

Figure 7:
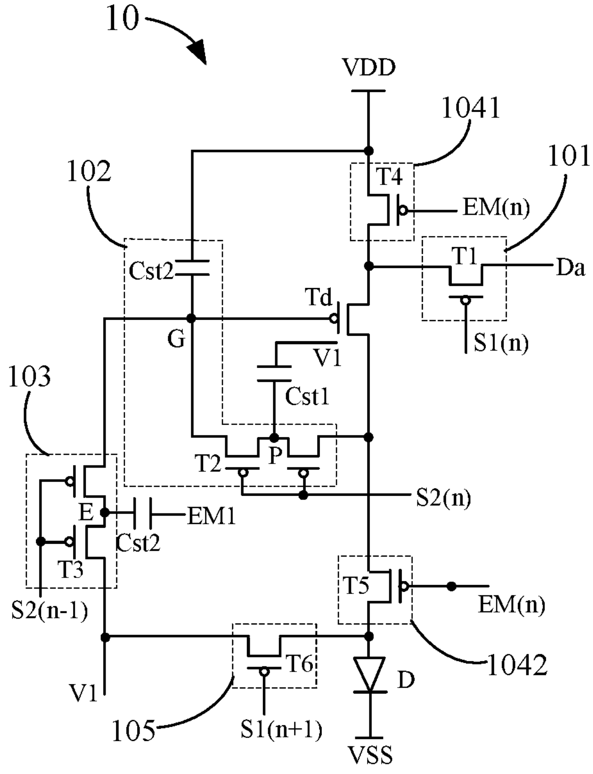
FIG. 7 illustrates a circuit diagram of the pixel circuit according to a fourth embodiment of the present disclosure.

Please refer to FIG. 7 illustrating is a circuit diagram of the pixel circuit according to a fourth embodiment of the present disclosure. Differing from the pixel circuit 10 shown in FIG. 5, in this embodiment, one end of the coupling capacitor Cst is connected to the double-gate node E of the third transistor T3. The other end of the coupling capacitor Cst is fed with the adjustment signal EM1(n).

Furthermore, one end of the second capacitor Cst3 is connected to the double gate node P of the second transistor T2, and the other end of the second capacitor Cst3 is fed with to the first initial signal V1.

Because one end of the coupling capacitor Cst is connected to the double gate node E of the third transistor T3, current leakage of the gate G of the driving transistor Td passing through the third transistor T3 can be reduced. In addition, because the second capacitor Cst3 is connected to the double-gate node Q of the second transistor T2, the potential of the double-gate node Q of the second transistor T2 can be clamped, thereby reducing current leakage of the gate G of the driving transistor Td.

The driving timing of the pixel circuit 10 is the same as the driving timing of the pixel circuit 10 in FIG. 5. For details, please refer to the above content, which will not be repeated here.

Figure 8:
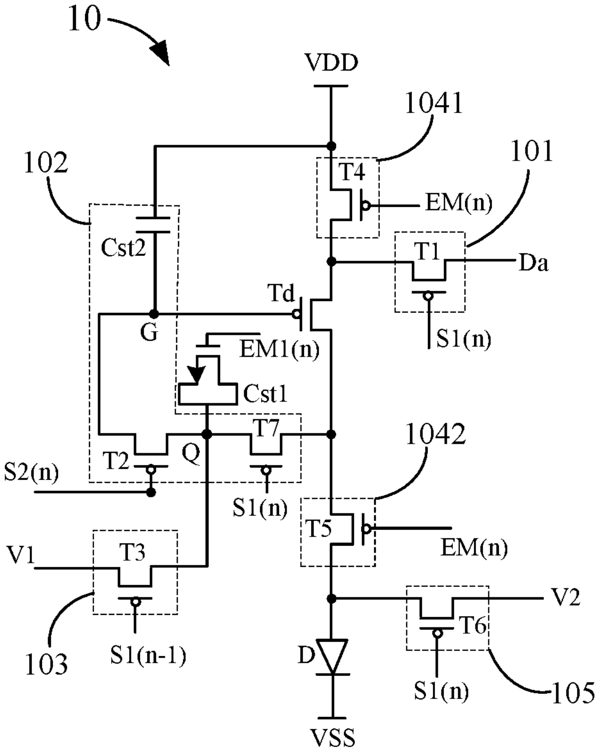
FIG. 8 illustrates a circuit diagram of the pixel circuit according to a fifth embodiment of the present disclosure.

Please refer to FIG. 8 illustrating is a circuit diagram of the pixel circuit according to a fifth embodiment of the present disclosure. Differing from the pixel circuit shown in FIG. 1, in this embodiment, the coupling capacitor Cst1 is a variable capacitor.

Specifically, the constant capacitor is a capacitor with two parallel plates. The variable capacitor are formed by transistors. As illustrated in FIG. 8, the gate of the transistor is connected to the adjustment signal EM1(n), and the source and drain of the transistor are shorted together and connected to the first node Q. The source and drain of the transistor are made of semiconductor material. When the potential of the gate is changed, the capacitance will change due to the difference in the accumulation of hole carriers at the semiconductor interface.

In the embodiment of the present disclosure, the coupling capacitor Cst1 which is a variable capacitor can be formed together with other transistors in the pixel circuit 10 by using the same process. In addition, the potential of the first node Q is pulled up or pulled down based on superimposed coupling effect of the coupling capacitor Cst1 in response to a change of the potential of the adjustment signal EM1(n).

In this embodiment of the present disclosure, the first scan signal S1(n), the third scan signal S1(n−1) and the fifth scan signal S1(n)+1) are generated by a set of Gate Driver on Array (GOA) circuits. The second scan signal S2(n) and the fourth scan signal S2(n−1) are generated by another set of GOA circuits. The first scan signal Scan1(n) and the second scan signal Scan2(n) may be generated by two sets of GOA circuits or one set of GOA circuits. The GOA circuit is well known to those skilled in the art, and details are not repeated here.

In this embodiment of the present disclosure, during low-frequency driving, the second scan signal S2(n) and the fourth scan signal S2(n−1) are set to low-frequency signal, such as 60 Hz signal. The first scan signal S1(n), the third scan signal S1(n−1) and the fifth scan signal S1(n)+1) maintain a high-frequency signal, such as 120 Hz signal. The data signal Da is designed as a high potential signal in the vertical blank period, and the source of the driving transistor Td can be fed with the bias signal at a high frequency. As a result, the threshold voltage shift of the driving transistor Td in the biased state for a long time at a low frequency is reduced, and the display quality is further improved.

In addition, the light emission control signal EM(n) and the adjustment signal EM1(n) are generated by a set of GOA circuits. Within one frame time, the first potential and the second potential of the adjustment signal EM1(n) can be arbitrarily set according to practical applications. The light-emitting control signal EM(n) is a high-frequency signal. The light-emitting control signal EM(n) is at a high voltage level for a very short time period to perform black insertion.

Figure 9:
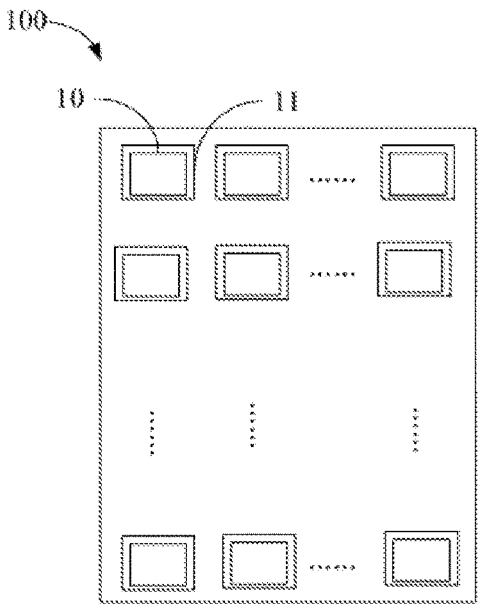
FIG. 9 is a block diagram of the display panel of the present disclosure.

Please refer to FIG. 9 illustrating a schematic diagram of a display panel according to an embodiment of the present disclosure. A display panel 100 includes a plurality of pixel units 11 arranged in an array. Each pixel unit 11 includes the pixel circuit 10 as provided in the above embodiments.

In this embodiment of the present disclosure, the display panel 100 may be an Active-Matrix Organic Light-Emitting Diode (AMOLED) display panel.

Figure 10:
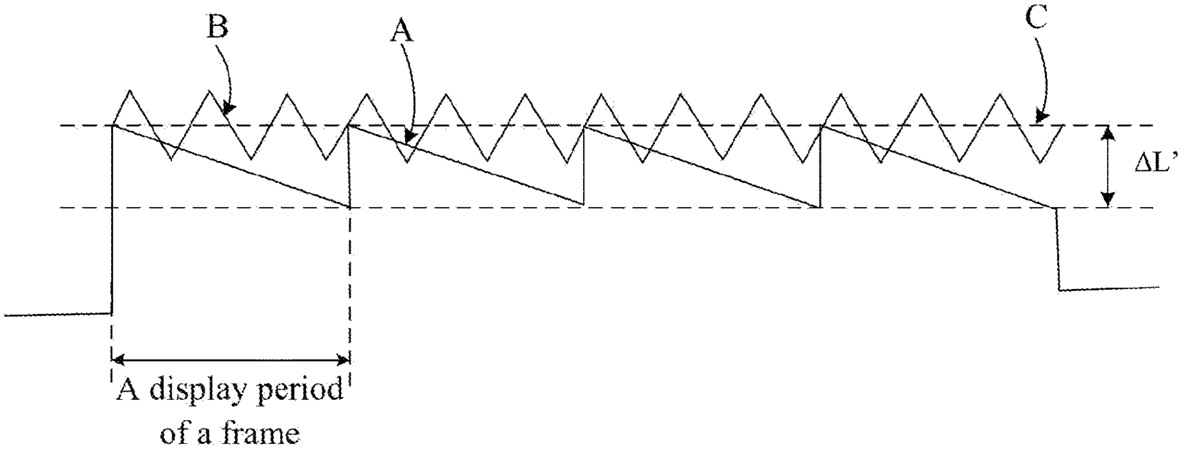
FIG. 10 is a brightness change when the display panel of the present disclosure is displayed.

Please refer to FIG. 10 illustrating a chart of the brightness of the display panel during display. The dotted line C represents the target brightness of the display panel 100 in one frame display period. Curve A represents the change trend of the brightness of the display panel 100 in one frame display period when the first initialization module is set to be connected to the gate of the driving transistor in the prior art. Curve B represents a change trend of the brightness of the display panel 100 in the embodiment of the present disclosure within a frame display period.

As can be seen in FIG. 10, in the display period of one frame of image, the luminance variation ΔL' of the conventional display panel is larger than that of the display panel 100 of the present disclosure. Under low-frequency driving, the light-emitting time is longer, and the display panel 100 can display more uniformly in a frame display period.

Embodiments of the present disclosure are directed to a pixel circuit 10 and a display panel 100. The pixel circuit 10 includes a coupling capacitor. In the light-emitting phase, by adjusting the time occupied by the first potential and the second potential of the adjustment signal, it is ensured that under long-term display, the gate of the driving transistor is improved, flicker is reduced, and display quality is improved.

A pixel circuit and a display panel according to the embodiments of the present disclosure have been introduced in detail above. The principles and implementations of the present disclosure are described with specific examples. The descriptions of the above embodiments are only used to help understand the present disclosure. At the same time, for those skilled in the art, according to the idea of this disclosure, there will be changes in the specific implementation and application scope. In summary, the content of this specification should not be construed as a restriction of the present disclosure.

What is claimed is:

1. A pixel circuit, comprising:

a light emitting device, applied with a first power signal and a second power signal;

a data signal writing module, outputting a data signal in response to a first scan signal;

a driving transistor, having a source coupled to the data signal writing module;

a threshold voltage compensation module, fed with coupled to a second scan signal and the first power signal, and connected to a drain of the driving transistor and a gate of the driving transistor;

a first initialization module, fed with a control signal and a first initial signal, and connected to the gate of the driving transistor;

a light emitting control module, fed with a light control signal, the first power signal and the second power signal; and a coupling capacitor, fed with an adjusting signal and connected to the first initialization module or the threshold voltage compensation module, wherein the threshold voltage compensation module comprises:

a second transistor, having a gate fed with the second scan signal, a source coupled to the gate of the driving transistor, and a drain coupled to a first node;

a seventh transistor, having a gate fed with the first scan signal, a source coupled to a first node, and a drain coupled to the drain of the driving transistor; and a first capacitor, fed with the first power signal and coupled to the gate of the driving transistor.

2. The pixel circuit according to claim 1, wherein one end of the coupling capacitor is connected to the first node, and the other end of the coupling capacitor is fed with the adjusting signal.

3. The pixel circuit according to claim 1, wherein the second transistor is a double-gate transistor; a first gate and a second gate of the second transistor are connected to the second scan signal; one end of the coupling capacitor is connected to a double gate node of the second transistor, and the other end of the coupling capacitor is fed with the adjusting signal.

4. The pixel circuit according to claim 2, wherein the first initialization module comprises a third transistor that comprises a gate fed with the control signal, a source fed with the first initial signal, and a drain connected to the first node.

5. The pixel circuit according to claim 1, wherein the threshold voltage compensation module comprises:

a second transistor, having a gate fed with the second scan signal, a source coupled to the gate of the driving transistor, and a drain coupled to the drain of the driving transistor; and a first capacitor, fed with the first power signal and coupled to the gate of the driving transistor.

6. The pixel circuit according to claim 5, wherein the second transistor is a double-gate transistor; a first gate and a second gate of the second transistor are connected to the second scan signal; one end of the coupling capacitor is connected to a double gate node of the second transistor, and the other end of the coupling capacitor is fed with the adjusting signal.

7. The pixel circuit according to claim 6, wherein the first initialization module comprises a third transistor that comprises a gate fed with the control signal, a source fed with the first initial signal, and a drain connected to the gate of the driving transistor;

wherein the third transistor is a double-gate transistor, and the pixel circuit further comprises a second capacitor, where one end of the second capacitor is connected to the double gate node of the third transistor, and the other end of the second capacitor is with the first initial signal.

8. The pixel circuit according to claim 5, wherein the first initialization module comprises a third transistor that comprises a gate fed with the control signal, a source fed with the first initial signal, and a drain connected to the gate of the driving transistor;

wherein the third transistor is a double-gate transistor; one end of the coupling capacitor is connected to the double-gate node of the third transistor, and the other end of the coupling capacitor is fed with the adjusting signal.

9. The pixel circuit according to claim 8, wherein the second transistor is a double-gate transistor, the first gate and second gate of the second transistor are connected to the second scan signal;

wherein the pixel circuit further comprises a second capacitor that is connected to the double gate node of the second transistor, and is fed with the first initial signal.

10. The pixel circuit according to claim 1, further comprising:

a second initialization module, comprising:

a sixth transistor, having a gate fed with the first scan signal, a source connected to the drain of the driving transistor, and a drain fed with a second initial signal.

11. The pixel circuit according to claim 1, further comprising:

a second initialization module, comprising:

a sixth transistor, having a gate fed with a fifth scan signal, a source connected to the drain of the driving transistor, and a drain fed with the first initial signal.

12. The pixel circuit according to claim 1, wherein the light emitting control module comprises:

a first light emitting control unit, comprising a fourth transistor; and a second light emitting control unit, comprising a fifth transistor;

wherein the gate of the fourth transistor and the gate of the fifth transistor are fed with the light emitting control signal, a source of the fourth transistor is fed with the first power signal, a drain of the fourth transistor is connected to the source of the driving transistor; a source of the fifth transistor is connected to the first electrode of the light emitting device, a drain of the fifth transistor is connected to the drain of the driving transistor.

13. The pixel circuit according to claim 1, wherein the coupling capacitor is a variable capacitor.

14. A display panel, comprising a plurality of pixel units arranged in an array, each of which comprising a pixel circuit according to claim 1.

15. The display panel according to claim 14, wherein the threshold voltage compensation module comprises:

a second transistor, having a gate fed with the second scan signal, a source coupled to the gate of the driving transistor, and a drain coupled to a first node;

a seventh transistor, having a gate fed with the first scan signal, a source coupled to a first node, and a drain coupled to the drain of the driving transistor; and a first capacitor, fed with the first power signal and coupled to the gate of the driving transistor.

16. The display panel according to claim 15, wherein one end of the coupling capacitor is connected to the first node, and the other end of the coupling capacitor is fed with the adjusting signal.

17. The display panel according to claim 15, wherein the second transistor is a double-gate transistor; a first gate and a second gate of the second transistor are connected to the second scan signal; one end of the coupling capacitor is connected to a double gate node of the second transistor, and the other end of the coupling capacitor is fed with the adjusting signal.

18. The display panel according to claim 14, wherein the threshold voltage compensation module comprises:

a second transistor, having a gate fed with the second scan signal, a source coupled to the gate of the driving transistor, and a drain coupled to the drain of the driving transistor; and a first capacitor, fed with the first power signal and coupled to the gate of the driving transistor.

19. The display panel according to claim 14, wherein the second transistor is a double-gate transistor; a first gate and a second gate of the second transistor are connected to the second scan signal; one end of the coupling capacitor is connected to a double gate node of the second transistor, and the other end of the coupling capacitor is fed with the adjusting signal.

* * * * *